United States Patent [19]

DelSignore, II et al.

[11] Patent Number: 4,630,100

[45] Date of Patent: Dec. 16, 1986

[54] COLOR VIDEO DRIVE CIRCUIT

[75] Inventors: James R. DelSignore, II, Trumansburg; Paul Sheehan, Ithaca, both of N.Y.; Robert H. Friedman, Mount Laurel, N.J.

[73] Assignee: NCR Corporation, Dayton, Ohio

[21] Appl. No.: 637,082

[22] Filed: Aug. 2, 1984

[51] Int. Cl.[4] .................................................. H04N 9/64

[52] U.S. Cl. .................................... 358/21 R; 358/11; 358/13; 358/27

[58] Field of Search .................... 358/11, 13, 21 R, 27, 358/40; 340/701, 703

[56] References Cited

U.S. PATENT DOCUMENTS

| | | | |
|---|---|---|---|
| 4,484,229 | 11/1984 | Parker | 358/27 |
| 4,550,338 | 10/1985 | Kojima | 358/27 |
| 4,553,141 | 11/1985 | Flasza | 358/27 |

*Primary Examiner*—Michael A. Masinick

*Attorney, Agent, or Firm*—Stephen F. Jewett; Robert L. Clark

[57] ABSTRACT

A gain control and signal conversion stage in a data converter for a color video CRT display system is disclosed. The disclosed circuit includes capacitors for supplying current at a selected output voltage level, voltage followers for charging the capacitors, and modulators for forming low-level analog color signals for control of video amplifiers in a color CRT display. Digital control of video brightness or contrast and precise color tracking are features which are discussed.

7 Claims, 7 Drawing Figures

DATA PROCESSING UNIT

PICTURE ASSEMBLY UNIT

COLOR VIDEO DRIVE CIRCUIT

BACKGROUND OF THE INVENTION

This invention relates to color video CRT (Cathode Ray Tube) display systems, including Eidophor type light-valve projector systems and projection display systems using CRT light sources. More particularly, the invention relates to data converters for color video CRT display systems in which digitized color picture information is converted to provide analog color signals for control of the video amplifiers in a CRT display.

In a color video CRT display system, operation involves formation and control of one or more electron beams. The beam or beams can be focused to a desired cross section and varied in position and intensity to produce a visible or otherwise detectable pattern on a screen. Each beam is conventionally generated by an electron gun driven with an amplified video voltage signal applied across gun electrodes. The intensities of the beam and resultant emissions of light usually vary directly in proportion to the level of the applied voltage. In state of the art systems, the beam is deflected and focused by electrostatic or magnetic means.

Most color systems employ three electron beams, a separate beam being used for causing emission of each of the three primary additive video colors of light. These are the colors red, green and blue, which when mixed in proper proportions, will form any other color or colors desired. For example, mixture of the three primary colors in equal proportions forms white. Black is formed by the absence of the three primary colors in any proportion.

In color video CRT display systems, pictures are generally formed from color picture information which is provided by a data source, such as a video broadcasting station, a video camera or a computer. The color picture information includes color information for controlling the intensity of the electron beam or beams which are produced in the CRT display. It also includes deflection information for controlling the deflection or target location of each beam. The deflection information may consist of horizontal and vertical sync information, vector coordinate information, or order of storage of color information in a memory, depending upon the type of system involved.

Data converters are used as necessary in color video CRT display systems to decode color picture information from the data source and to convert the information to a form required for driving the CRT display. A color CRT display normally requires input of color information in the form of three separate serial analog data or color signals, where each such signal controls the electron beam intensity for a different one of the three primary additive video colors. These analog color signals are usually voltage signals characterized by an "off" or "black" signal voltage level and an "on" signal voltage level. In some systems, the "on" signal voltage level may be variable for color control or control of intensity variations in the color picture formed on the CRT display which is used.

Most color video CRT displays require input of a low-level analog color signals having peak-to-peak voltages on the order of about 0.5 to 5 volts. These low-level analog color signals conventionally control or are input to video amplifiers in the CRT display unit. The video amplifiers provide amplified or high-level analog color output signals having peak-to-peak voltages on the order of about 30 to 150 volts as required for driving an electron gun in the particular CRT display.

In some data converters for color video CRT display systems, color picture information is processed or decoded to a digitized form. Examples are data converters which have semiconductor logic circuits for information processing or semiconductor memories for screen refresh purposes. Such data converters commonly provide color information in the form of separate serial digital data signals for each of the three primary additive video colors. These digital color signals may be used directly as the low-level color analog signals for input to the CRT display unit, or they may be used as inputs to a gain control and signal conversion stage for which the low-level analog color signals are output. The gain control and signal conversion stage may be used to provide conversion from digital to required analog voltage levels, and to provide low-level analog color signals with requisite current sourcing capability for driving the CRT display.

Current technology has used special high-speed, high-cost switching transistors, or differential amplifiers, to drive large band width (e.g., 25 MHz band width) color video amplifiers. In addition, complicated circuitry has been often seen as necessary for providing variable low-level analog color signals for controlling video brightness or contrast. Some circuits fail to provide precise color or voltage tracking because of temperature effects on active component circuit parts.

It was against the foregoing background that the present invention was made.

SUMMARY OF THE INVENTION

This invention resides in a gain control and signal conversion stage in a data converter for a color video CRT display system. The data converter is of the type having a section which provides color picture information in the form of a separate serial digital data signal for at least two of the three primary additive video colors (red, green and blue).

The gain control and signal conversion stage makes use of a reference voltage source for providing a reference voltage at a specific level. Preferably, the reference voltage source is a variable source, such as a digital-to-analog voltage converter, for control of video brightness or contrast.

For each of the primary additive video colors for which a separate serial digital data signal is provided in the above-mentioned section of the data converter, the gain control and signal conversion stage has an output terminal for output of a separate serial low-level analog data or color signal for control of a CRT video amplifier for the associated primary color. Each such separate analog signal is characterized by an "on" signal voltage level and a "black" (or "off") signal voltage level.

Coupled to each of the output terminals is a separate capacitor for storing a charge at a voltage level which defines the "on" signal voltage level which characterizes the associated low-level analog color signal. Each such capacitor is coupled to a separate voltage follower which is responsive to a disproportion between the reference voltage and the voltage across the capacitor. The capacitor is charged by the voltage follower when the capacitor voltage is less than a level defined by the reference voltage. Preferably, the voltage follower comprises a power transistor which is driven by an operational amplifier. A separate modulator, such as an open-collector output TTL buffer, is included for switching each output terminal potential between the "on" signal voltage level and the "black" signal voltage level of the associated low-level analog color signal. Each modulator is switched according to the logic level of the separate serial digital data signal for the associated primary color.

One object of the invention is to provide a gain control and signal conversion stage in which the active components can be relatively inexpensive, medium-speed parts.

Another object of the invention is to provide a gain control and signal conversion stage for producing low-level analog color signals having precisely matched peak-to-peak voltages.

Still another object of the invention is to provide a gain control and signal conversion stage in which the output low-level analog color signals are not affected by temperature or production tolerance effects on the active components in the stage construction.

The foregoing and other objects and advantages of the invention will become apparent upon reference to the description to follow and the appended drawings.

BRIEF DESCRIPTION OF THE DRAWINGS

In the appended drawings,

FIGS. 5A, 5B and 6 together depict features of the presently-preferred embodiment of the invention.

DETAILED DESCRIPTION OF PRESENTLY PREFERRED EMBODIMENTS

Figure 1:
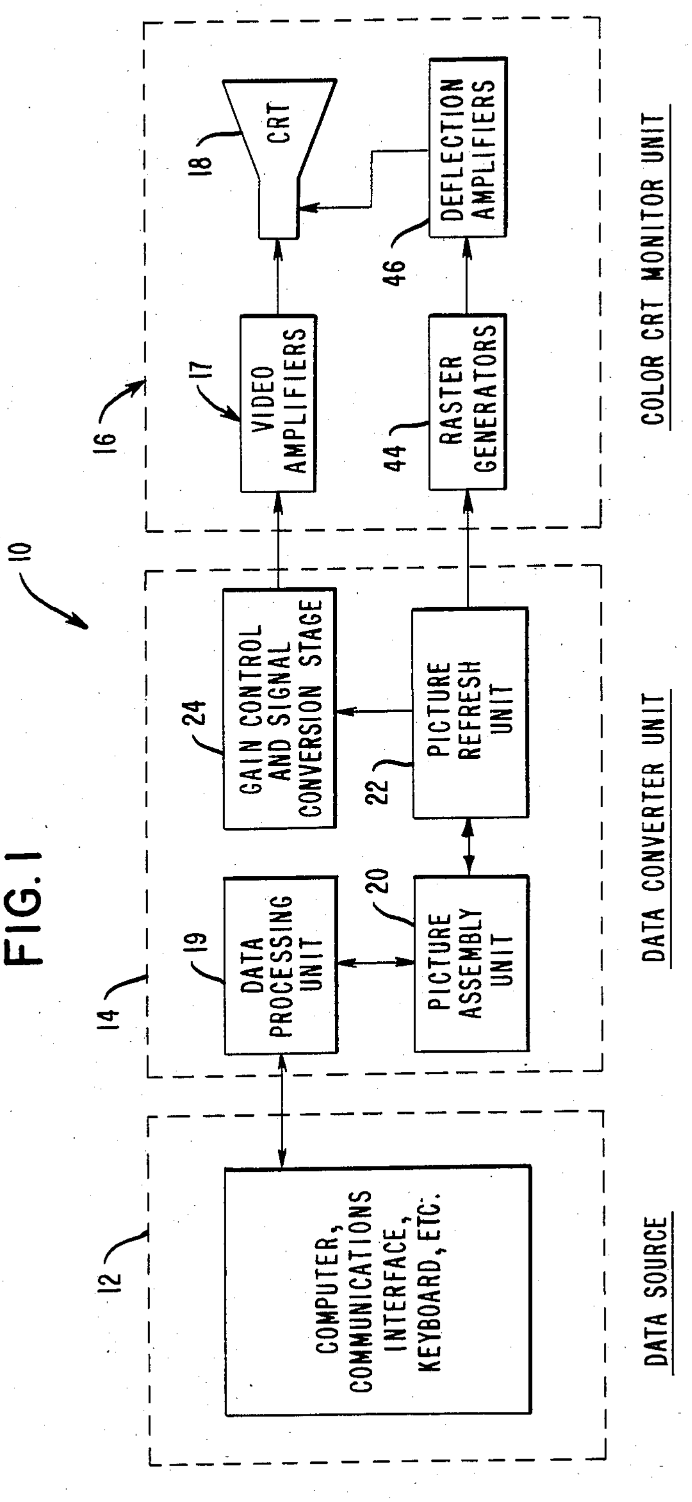
FIG. 1 is a functional block diagram for an exemplary color video CRT display system.

FIG. 1 shows a functional block diagram for an exemplary color video CRT display system 10, given to illustrate the presently-preferred embodiment of the invention. As shown, the system 10 comprises a data source 12, a data converter unit 14 and a color CRT monitor unit 16. The data source 12 may be any source of digitized color picture information, such as a conventional computer, communications interface, keyboard or like source of digitized data.

The function of the data converter unit 14 is to receive digitized color picture information from the data source 12, and to convert that information to an analog form required for operation of the color CRT monitor unit 16. Apart from the special gain control and signal conversion stage of the data converter unit 14 to be described, the construction of the data converter unit 14 may be the same as for any conventional unit of like function in which there is circuitry or a section which provides color information in the form of a separate serial digital data signal for each of the primary additive video colors (red, green and blue). An example of such a construction is the Model No. 7959 color video display terminal made by NCR Corporation.

The color CRT monitor unit 16 comprises video amplifiers 17 driving a CRT display screen 18, and may be any conventional monitor unit made to be controlled by input of serial analog data or color signals. For example, an internally or externally synchronized raster television monitor may be used, or the monitor may be of the random deflection or vector type, provided only that there is compatibility between the data converter unit 14 and the color CRT monitor unit 16. In the example illustrated in FIG. 1, the color CRT monitor unit 16 is of an externally synchronized raster television type, such as the G09-101 13-inch RGB color monitor made by Electrohome Ltd.

As shown in FIG. 1, the exemplary data converter unit 14 has functionally a data processing unit 19, a picture assembly unit 20, a picture refresh unit 22 and a special gain control and signal conversion stage 24. A functional block diagram for the data processing unit 19 is shown in FIG. 2.

Figure 2:
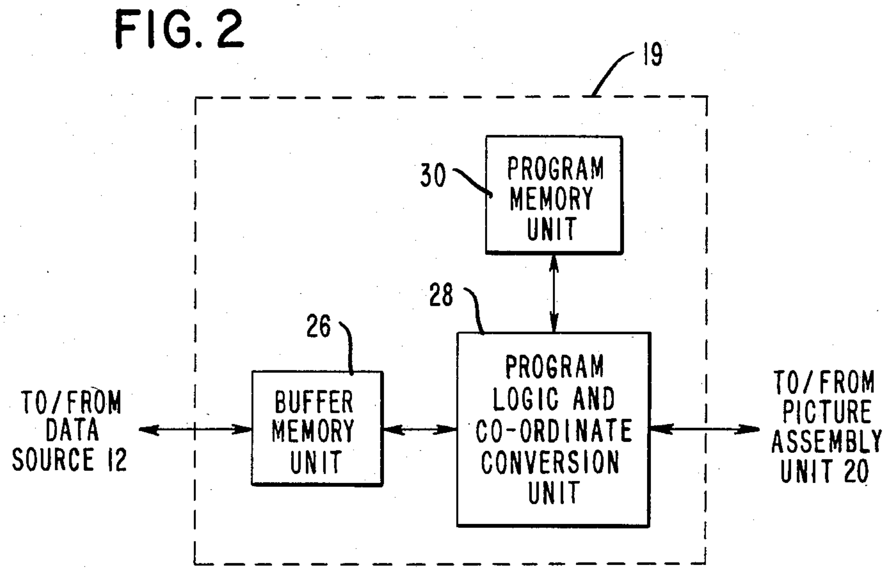
FIG. 2 is a functional block diagram for the data processing unit of the system shown in FIG. 1.

As shown in FIG. 2, the data processing unit 19 functionally comprises a buffer memory unit 26, a program logic and coordinate conversion unit 28 and a program memory unit 30. The buffer memory unit 26 stores color picture information as it is being written to or read from the color CRT monitor unit 16. The program logic and coordinate conversion unit 28 addresses and exchanges color picture information and other instructions between the buffer memory unit 26 and the picture assembly unit 20. The program logic and coordinate conversion unit 28 will typically comprise a microprocessor operating under control of computer program codes stored in the program memory unit 30 which may be internal or external to the microprocessor.

Figure 3:
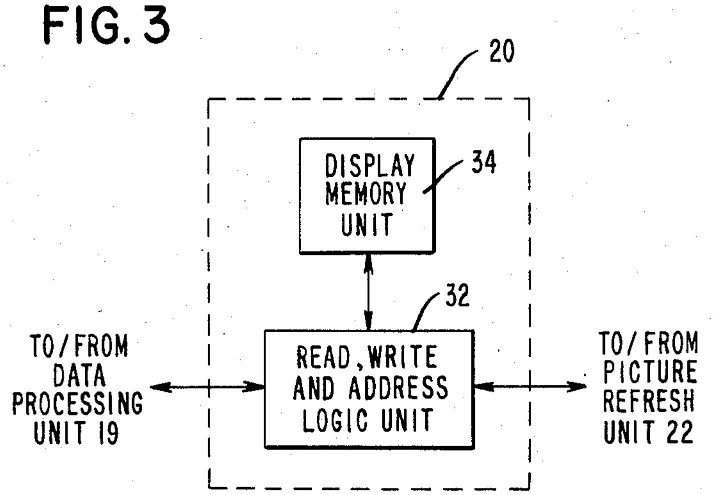
FIG. 3 is a functional block diagram of the picture assembly unit of the system shown in FIG. 1.

FIG. 3 is a functional block diagram of the picture assembly unit 20. The picture assembly unit 20 as shown functionally comprises a read, write and address logic unit 32 and a display memory unit 34. The read, write and address logic unit 32 gates color picture information between the data processing unit 19, the picture refresh unit 22 and the display memory unit 34. The display memory unit 34 is typically a RAM type semiconductor memory which serves as a screen refresh memory and stores digitized color picture information defining the picture currently being displayed by the color CRT monitor unit 16.

Figure 4:
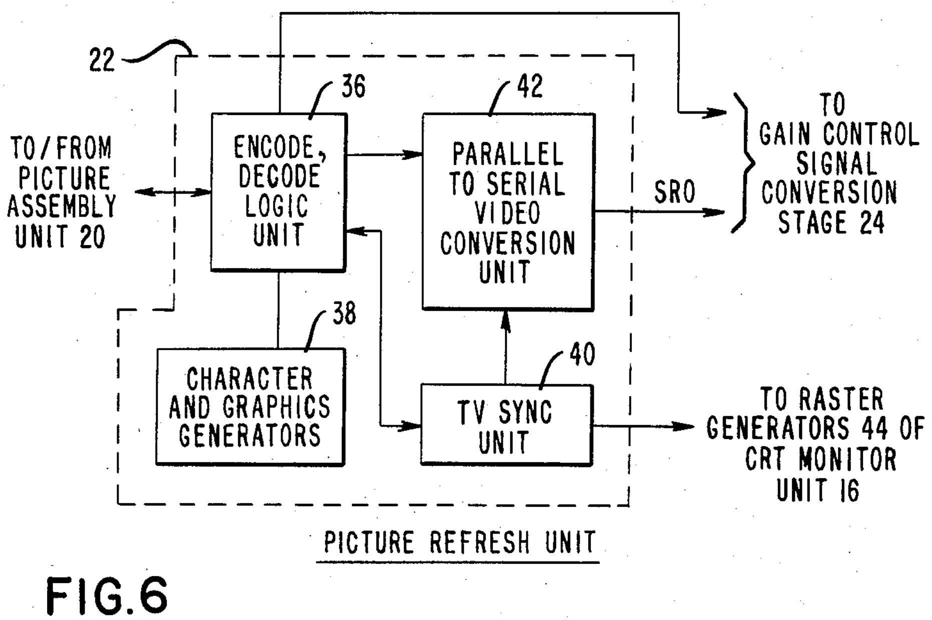
FIG. 4 is a functional block diagram of the picture refresh unit of the system shown in FIG. 1.

FIG. 4 illustrates a functional block diagram of the picture refresh unit 22. The picture refresh unit 22 as shown functionally comprises an encode, decode logic unit 36, character and graphics generators 38, a TV sync unit 40 and a parallel-to-serial video conversion unit 42. The encode, decode logic unit 36 conventionally includes a microprocessor programmed to receive color picture information in the form of parallel digital address information from the picture assembly unit 20. This address information is converted by the character and graphics generators 38, typically a semiconductor ROM type memory, to provide the digitized alphanumeric and graphics video codes to be transmitted to the color CRT monitor unit 16 (shown in FIG. 1). Information from the character and graphics generators 38 is gated by the encode, decode logic unit 36 through the parallel-to-serial video conversion unit 42, typically a buffered semi-conductor shift register, which converts the information to a serial digital output signal SRO to be transmitted to the gain control and signal conversion stage 24 (shown in FIG. 1). The encode, decode logic unit 36 provides color picture information to the gain control and signal conversion stage 24 in the form of digitized color attribute information and digital contrast or brightness codes as will be further described below. The TV sync unit 40 provides synchronizing information, in the form of horizontal and vertical synchronizing pulses, for timing of the deflection circuits in the color CRT monitor unit 16. As shown in FIG. 1, the deflection circuits comprise conventional raster generators 44 and deflection amplifiers 46 in the color CRT monitor unit 16. The TV sync unit 40 also controls timing of the encode, decode logic unit 36 and the parallel-to-serial video conversion unit 42.

The TV sync unit 40 is typically a series of digital semiconductor counter circuits driven by operation of a master clock. Functionally, the TV sync unit 40 can be conceptualized as comprising a column counter, a character counter, a row counter and a line counter. The column counter is driven by the master clock and in turn drives the character counter and the parallel-to-serial video conversion unit 42. The parallel-to-serial video conversion unit 42 is driven at a frequency equal to the number of horizontal picture elements scanned per second by the color CRT monitor unit 16, so that the output of the parallel-to-serial video conversion unit 42 is shifted by one for each picture element scanned during each horizontal scan. The character counter drives the encode, decode logic unit 36 for accessing the display memory unit 34 (shown in FIG. 3) for the next character over and for accessing the character and graphics generators 38 for return of the corresponding character codes. The character counter also drives the encode, decode logic unit 36 for transmitting successive characters to the parallel-to-serial video conversion unit 42. The character counter in addition advances the row counter which at the end of each scanned horizontal TV line advances the line counter by one and generates the horizontal sync signals which are sent to the color CRT monitor unit 16 (shown in FIG. 1). When the total number of horizontal TV lines on the screen have been scanned, the line counter generates the vertical sync signals which are sent to the CRT monitor unit 16 to initiate another vertical sweep of the CRT screen. (CRT controller IC's are available to perform the functions of the TV synch unit 40 and some of the functions attributed to the encode, decode logic unit 36. For example, the MC6845 is a CRT controller IC made by Motorola Semiconductor Products, Inc. for providing video timing and refresh memory addressing as an interface to raster scan CRT displays.)

Figure 5A:
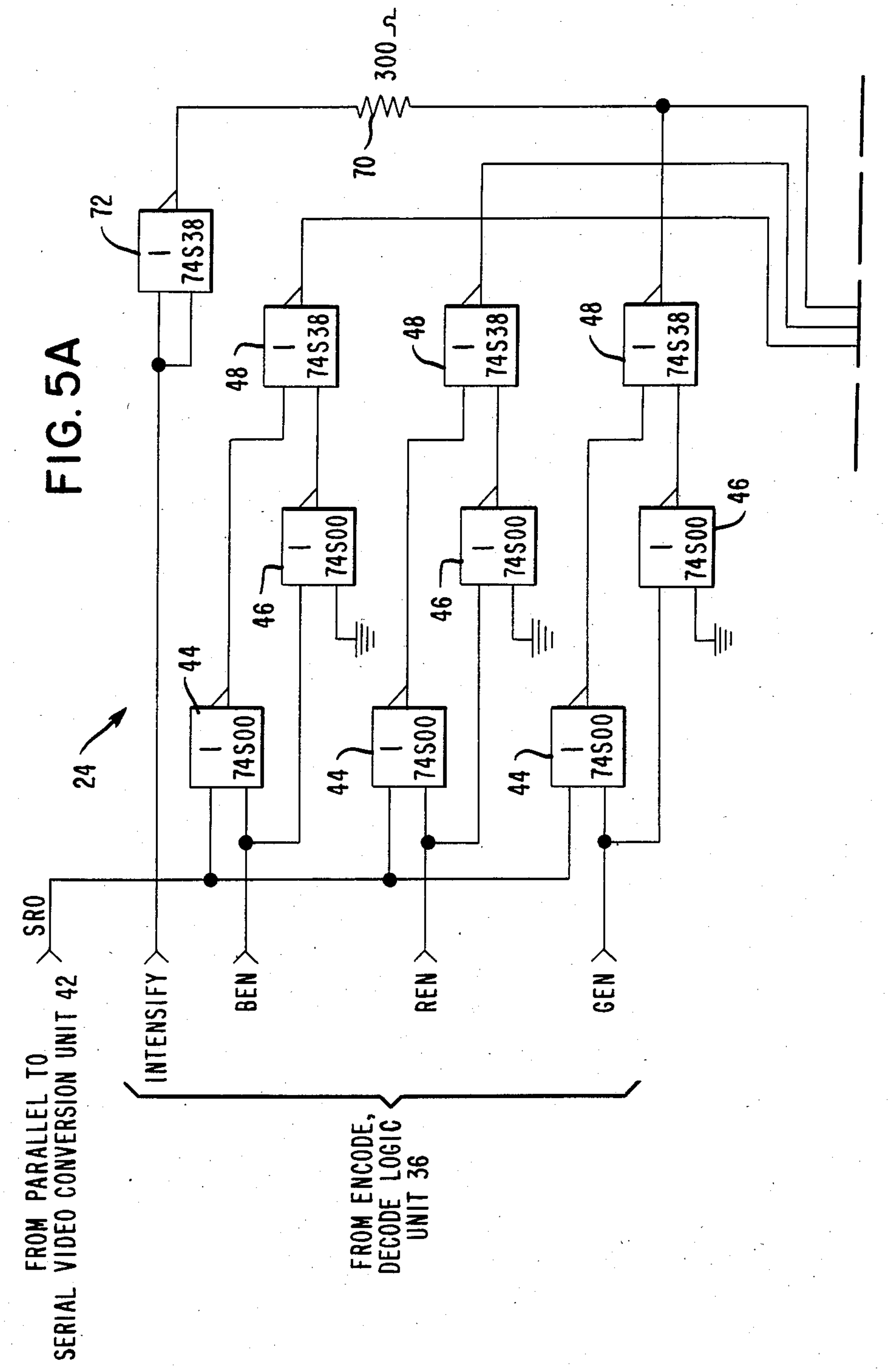
FIGS. 5A and 5B together show a detailed circuit diagram of the gain control and signal conversion stage of the system shown in FIG. 1.
Figure 5B:
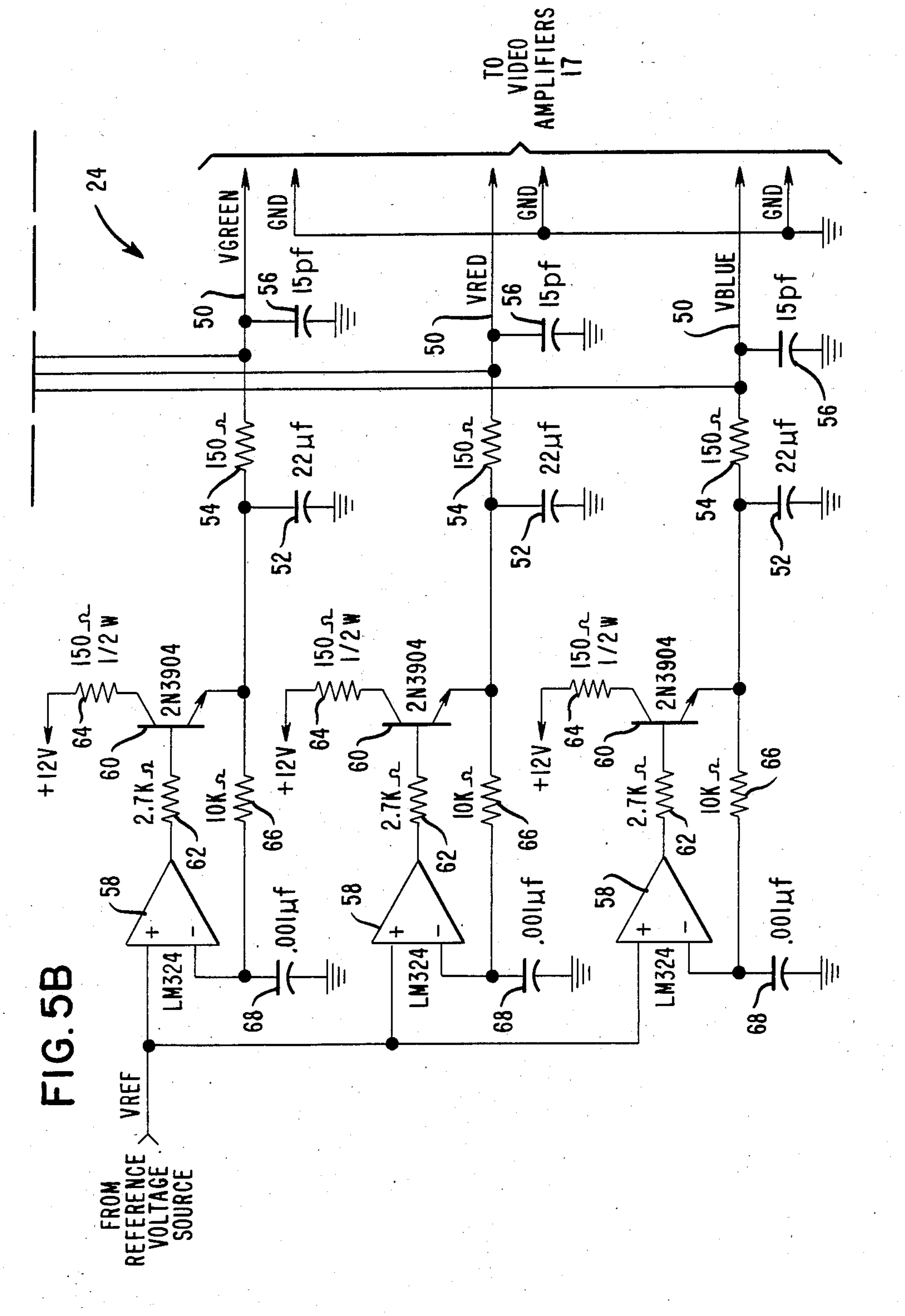

FIGS. 5A and 5B together show a detailed circuit diagram of the gain control and signal conversion stage 24 of the data converter unit 14 shown in FIG. 1. As shown in FIG. 5A, the encode, decode logic unit 36 (shown in FIG. 4) provides three signals, BEN, REN and GEN, which when combined with the signal SRO provided by the parallel-to-serial video conversion unit 42 (shown in FIG. 4), represent separate serial digital data signals for each of the three primary additive video colors (blue, red and green, respectively). The signals BEN, REN and GEN are each "enable" signals. For each of the signals BEN, REN and GEN, a positive logic level or "1" state enables a corresponding separate serial digital data signal for the corresponding one of the three primary additive video colors, and a zero logic level or "0" state disenables the separate data or color signal for the corresponding color. The signal SRO represents the serial digital data signal output of the parallel-to-serial video conversion unit 42 shown in FIG. 4.

As FIG. 5A shows, the gain control and signal conversion stage 24 comprises, for each of the three primary additive video colors, a pair of positive-logic, 2-input NAND gates 44 and 46 and a modulator 48. Each of the three modulators 48 comprise positive-logic, 2-input NAND gate buffers with open collector outputs. The outputs of the modulators 48 are internally connected to ground potential when the logic levels of the corresponding signals BEN, REN and GEN are zero. When the logic levels of the corresponding signals BEN, REN and GEN are positive, the outputs of the modulators 48 are internally switched between ground potential and an open circuit or high impedance state according to the logic level of the signal SRO. When the modulators 48 are enabled, by the signals BEN, REN and GEN, the modulators 48 will have ground potential outputs when the logic level of the signal SRO is zero and open circuit outputs when the logic level of the signal SRO is positive.

Referring to FIG. 5B, the gain control and signal conversion stage 24 includes three output terminals 50 for output of signals VGREEN, VRED and VBLUE, each of which is a separate serial analog data or color signal for control of the CRT video amplifiers 17 (shown in FIG. 1) for the respective primary colors green, red and blue. The signals VGREEN, VRED and VBLUE are each characterized by an "on" signal voltage level and a "black" or "off" signal voltage level. To control the peak-to-peak voltages of the signals VGREEN, VRED and VBLUE, or the difference between their "on" and "black" signal voltage levels, the gain control and signal conversion stage 24 is provided with a reference voltage $V_{REF}$ which is a DC voltage from a reference voltage source. Variation in the peak-to-peak voltages of the signals VGREEN, VRED and VBLUE will control contrast or brightness in the displayed CRT picture, depending upon the circuitry comprising the color CRT monitor unit 16 shown in FIG. 1. The peak-to-peak voltages of the signals VGREEN, VRED and VBLUE will typically be varied between about 0.5 and 5 volts for the circuit shown in FIG. 5. Accordingly, the signals VGREEN, VRED and VBLUE are characteristic of low-level analog data or color signals for control of CRT video amplifiers in a color video CRT display.

For each of the primary additive video colors, the part of the gain control and signal conversion stage 24 shown in FIG. 5B includes a capacitor 52 for storing a charge at a voltage level which defines the "on" signal voltage level for the signals VGREEN, VRED and VBLUE, respectively. The capacitors 52 are coupled to the respective output terminals 50 through source resistors 54 and source capacitors 56. Resistors 54 and capacitors 56 are impedance matching elements and their values are selected for optimized frequency response and power transfer depending upon the load impedance of the color video CRT amplifiers to be driven. In the circuit portion illustrated in FIG. 5B, the values of resistors 54 and capacitors 56 were selected for the G09-101 13-inch RGB color CRT display monitor made by Electrohome Ltd. The capacitance values for the capacitors 52 are selected for minimal percentage discharging during operation of the gain control and signal conversion stage 24. Preferably, the capacitors 52 each have a capacitance value C which is greater than $15 \div (fH \times (R_S+R_I))$, where $f_H$ is the horizontal scan frequency for the color video CRT display, $R_S$ is the resistance value for the resistors 54, and $R_L$ is the resistive load impedance of each of the associated video amplifiers of the color video CRT display. In the circuit shown in FIG. 5, the value of C was placed at 22 microfarads based on $R_S$ being 150 ohms, and assumed values of 150 ohms for $R_L$ and 23 kHz for $f_H$.

For each of the capacitors 52, there is a voltage follower which comprises an operational amplifier 58 and a power transistor 60. The operational amplifiers 58 can be medium slew rate parts and their outputs are coupled through load resistors 62 for biasing the base-emitter junctions of the transistors 60. The transistors 60 are NPN type devices and are coupled to positive collector voltage supply sources through pull-up resistors 64. (While the transistors 60 are shown as being NPN type devices, they could equally be PNP type devices in a complementary circuit.) The positive input terminals of the operational amplifiers 58 are commonly connected for sensing the reference voltage $V_{REF}$. The negative input terminals of the operational amplifiers 58 are respectively coupled to the emitters of transistors 60 through low pass filters comprising resistors 66 and capacitors 68. The emitters of the transistors 60 are respectively coupled to the output terminals 50 by being connected for charging the capacitors 52.

It will be seen that the operational amplifiers 58 are responsive to a disproportion between the reference voltage $V_{REF}$ and the capacitor voltage across the capacitors 52. The capacitors 52 are respectively charged by the transistors 60 when the voltages across the capacitors 52 are less than a level defined by the reference voltage $V_{REF}$. Due to the relatively high impedance presented by the low pass filters comprising resistors 66 and capacitors 68 as shown in FIG. 5, the capacitors 52 are respectively charged whenever their voltages drop below $V_{REF}$.

In the circuit portion shown in FIG. 5B, when the voltage across a capacitor 52 is less than the reference voltage $V_{REF}$, the capacitor 52 is charged by the associated transistor 60 until the voltage across the capacitor 52 is brought equal to the reference voltage $V_{REF}$. If the voltage across a capacitor 52 should be greater than the reference voltage $V_{REF}$, as when the reference voltage $V_{REF}$ is decreased, the capacitor 52 will discharge through the associated output terminal 50 and modulator 48 until the voltage across the capacitor 52 is practically equal to the reference voltage $V_{REF}$.

The outputs of modulators 48 are respectively connected to output terminals 50. In operation, the modulators 48 respectively switch the potential at the output terminals 50 between the "on" signal voltage levels and the "black" signal voltage levels of the signals VGREEN, VRED and VBLUE. The potentials of the output terminals 50 are respectively switched according to the logic levels of the corresponding separate serial digital data or color signals from the encode, decode logic unit 36 and the parallel-to-serial video conversion unit 42 shown in FIG. 4.

As shown in FIG. 5A, the gain control and signal conversion stage 24 may further include a voltage divider leg resistor 70 and a switch 72. The resistor 70 is connected to the output of the switch 72 and to the output terminal 50 (shown in FIG. 5B) for the signal VGREEN. The switch 72 is responsive to an INTENSIFY signal from the encode, decode logic unit 36 shown in FIG. 4 and connects and disconnects the resistor 70 with respect to ground potential to thereby adjust the "on" signal voltage level of the signal VGREEN to either one of two levels for additional brightness and contrast control. As shown in FIG. 5A, the switch 72 may comprise a positive-logic, 2-input NAND gate buffer with an open collector output. The gain control and signal conversion stage 24 may optionally include one or more similar voltage divider leg resistors and corresponding switches connected to one or more of the output terminals 50 (shown in FIG. 5B) for purposes of additional brightness or contrast control for the individual signals VGREEN, VRED and VBLUE.

Figure 6:
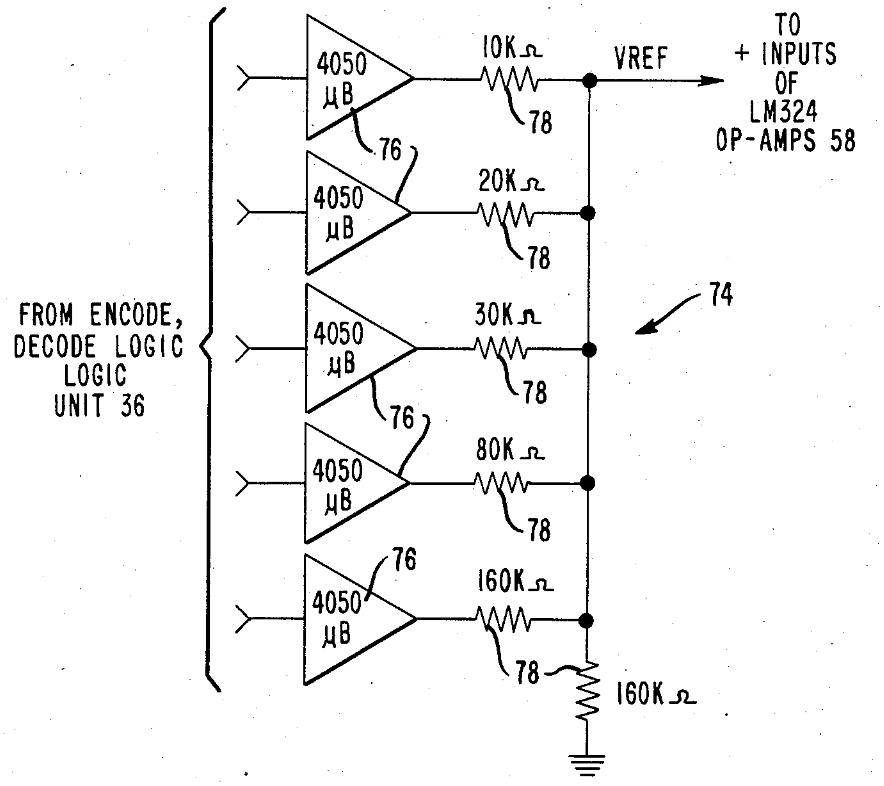
FIG. 6 is a detailed circuit diagram of a voltage reference source for the gain control and signal conversion stage shown in FIGS. 5A and 5B.

FIG. 6 illustrates a detailed circuit diagram of a variable reference voltage source 74 suitable for producing the reference voltage $V_{REF}$ shown in FIG. 5B. The voltage source 74 is a digitally-controlled resistive ladder network type digital-to-analog voltage converter similar to circuitry disclosed in U.S. Pat. No. 4,280,082 issued to Acharya et al. The voltage source 74 comprises multiple non-inverting type buffer-drivers 76 and ladder network resistors 78. By digital signals input from the encode, decode logic unit 36 shown in FIG. 4, the voltage source 74 shown in FIG. 6 will output a reference voltage $V_{REF}$ which can be varied step-wise between ground potential level and slightly less than the supply voltage for the buffer drivers 76. The digital signal inputs to the voltage source 74 may be provided under computer or microprocessor control via a peripheral interface adapter (PIA) included in the encode, decode logic unit 36 shown in FIG. 4.

An advantage of the gain control and signal conversion stage 24 shown in FIGS. 5A and 5B is that it does not rely on switching times of the active circuit components, e.g., modulators 48, operational amplifiers 58 and transistors 60, but instead uses stored charge from capacitors 52 to provide exact controllable video signal amplitudes for the signals VGREEN, VRED and VBLUE. Another advantage of the stage 24 is that temperature or production tolerance effects on the active or passive circuit components do not affect the amplitude matched signal voltage levels for the signals VGREEN, VRED and VBLUE.

While specific embodiments of the invention have been herein discussed and described, it will be appreciated that the invention may be variously embodied and practiced in other forms. It is to be understood, therefore, that the invention is defined and limited only by the scope of the following claims.

What is claimed is:

1. In a color video CRT display system, said display system being of the type having circuitry which provides color picture information in the form of a serial digital input signal having a plurality of logic levels for one of the primary additive video colors, the improvement wherein said display system includes a gain control and signal conversion stage connected for receiving said serial digital input signal and for providing a serial output signal for control of a video amplifier associated with said one of said colors, wherein said stage comprises:

(a) Output terminal means for output of the serial output signal for control of the video amplifier, said serial output signal being characterized by an "on" signal voltage level and a "black" signal voltage level;

(b) Capacitor means coupled to said output terminal means for storing a charge at a voltage level which defines said "on" signal voltage level;

(c) Voltage follower means responsive to a disproportion between a reference voltage and the capacitor voltage across said capacitor means, for charging said capacitor means when said capacitor voltage is less than a level defined by said referenced voltage; and (d) Modulator means for switching the potential at said output terminal means between said "on" signal voltage level and said "black" signal voltage level, with said potential being switched according to the logic level of said serial digital input signal.

2. In a data converter for a color video CRT display system, said data converter being of the type having a section which provides color picture information in the form of a separate serial digital data signal for two or more of the three primary additive video colors, a gain control and signal conversion stage for providing serial low-level analog color signals for control of video amplifiers in a color video CRT display, wherein said stage comprises:

(a) A reference voltage source for providing a reference voltage at a specific level; and (b) For each of the primary additive video colors for which a separate serial digital data signal is provided in said section of the data converter:

(i) An output terminal for output of a separate serial low-level analog color signal for control of a CRT video amplifier for the associated primary color, said separate analog signal being characterized by an "on" signal voltage level and a "black" signal voltage level;

(ii) A capacitor coupled to said output terminal for storing a charge at a voltage (iii) A voltage follower responsive to a disproportion between said reference voltage and the capacitor voltage across said capacitor, for charging said capacitor when said capacitor voltage is less than a level defined by said reference voltage; and (iv) A modulator for switching the potential at said output terminal between said "on" signal voltage level and said "black" signal voltage level, with said potential being switched according to the logic level of the separate serial digital data signal for the associated primary color.

3. The gain control and signal conversion stage of claim 2 wherein, for each of said primary additive video colors for which a separate serial digital data signal is provided in said section of the data converter, said voltage follower comprises an operational amplifier and a power transistor, said operational amplifier having a first input terminal for sensing said reference voltage and a second input terminal for sensing a voltage level defined by said capacitor voltage, said operational amplifier also having a voltage output means for output of a voltage when the voltage at said second input terminal is less than the voltage at said first input terminal, and said power transistor being coupled to said output means and connected for gating a current to charge said capacitor when the voltage at said second input terminal is less than the voltage at said first input terminal.

4. The gain control and signal conversion stage of claim 3 wherein said reference voltage source is a digital to analog voltage converter comprising a resistive ladder network, the voltage level of said reference voltage being set by logic levels of digital data signals input to said digital to analog voltage converter to control the contrast or brightness in a CRT display.

5. The gain control and signal conversion stage of claim 4 wherein, for each of said primary additive video colors for which a separate serial digital data signal is provided in said section of the data converter, said capacitor is coupled to said output terminal through a source resistor having a resistance $R_S$ and said capacitor has a capacitance C which is greater than $15 \div (fH \times (R_S+R_L))$, where fH is the horizontal scan frequency for said color video CRT display and $R_L$ is the resistive load impedance of the associated video amplifiers of said color video CRT display.

6. The gain control and signal conversion stage of claim 5 wherein, for each of said primary additive video colors for which a separate serial digital data signal is provided in said section of the data converter, said modulator comprises a TTL buffer having an open collector output coupled to said output terminal.

7. The gain control and signal conversion stage of claim 3 wherein, for each of said primary additive video colors for which a separate serial digital data signal is provided in said section of the data converter, said second input terminal of the operational amplifier is coupled to said capacitor through a low pass filter.

* * * * *

UNITED STATES PATENT AND TRADEMARK OFFICE

CERTIFICATE OF CORRECTION

PATENT NO. : 4,630,100

DATED : December 16, 1986

INVENTOR(S) : James R. DelSignore, II et al.

It is certified that error appears in the above—identified patent and that said Letters Patent is hereby corrected as shown below:

Column 9, line 35, after the word "voltage", insert --level which defines said "on" signal voltage level;--.

Signed and Sealed this

Thirty-first Day of March, 1987

*Attest:*

DONALD J. QUIGG

*Attesting Officer*

*Commissioner of Patents and Trademarks*